(12) United States Patent  
Chen et al.

(10) Patent No.: US 8,098,839 B2
(45) Date of Patent: Jan. 17, 2012

(54) VOLTAGE GENERATING APPARATUS FOR HEADPHONE

(75) Inventors: Hsu-Min Chen, Hsinchu (TW); Tzu-An Lin, Hsinchu (TW)

(73) Assignee: ITE Tech, Inc., Hsinchu (TW)

( * ) Notice: Subject to any disclaimer, the term of this patent is extended or adjusted under 35 U.S.C. 154(b) by 517 days.

(21) Appl. No.: 12/402,498

(22) Filed: Mar. 12, 2009

(65) Prior Publication Data

US 2010/0181982 A1 Jul. 22, 2010

(30) Foreign Application Priority Data

Jan. 21, 2009 (TW) .............................. 98102324 A (51) Int. Cl.
*H04R 1/10* (2006.01)
(52) U.S. Cl. .......................................... 381/74; 381/370
(58) Field of Classification Search ..................... 381/74, 381/120, 370, 384; 330/127, 297
See application file for complete search history.

(56) References Cited

U.S. PATENT DOCUMENTS

| | | | | |
|---|---|---|---|---|
| 5,289,137 A * | 2/1994 | Nodar et al. | ................ | 330/296 |
| 6,011,440 A * | 1/2000 | Bell et al. | .................... | 330/297 |
| 6,525,684 B2 * | 2/2003 | Tsujikawa | ................... | 341/155 |
| 7,061,327 B2 | 6/2006 | Doy | | |
| 7,061,328 B2 | 6/2006 | Doy | | |
| 7,453,296 B2 * | 11/2008 | Masenas | ...................... | 327/158 |
| 7,679,451 B2 * | 3/2010 | Chen et al. | .................. | 330/297 |
| 7,714,660 B2 * | 5/2010 | Lesso et al. | .................. | 330/297 |
| 7,782,141 B2 * | 8/2010 | Witmer et al. | ............... | 330/297 |
| 2008/0290950 A1 * | 11/2008 | Azuhata et al. | ............... | 330/297 |
| 2009/0003618 A1 * | 1/2009 | Doy | ................ | 381/74 |
| 2010/0148867 A1 * | 6/2010 | Chen et al. | .................. | 330/199 |
| 2010/0164630 A1 * | 7/2010 | Witmer et al. | ............... | 330/297 |

\* cited by examiner

*Primary Examiner* — Kevin M Picardat
(74) *Attorney, Agent, or Firm* — Jianq Chyun IP Office (57) ABSTRACT

A voltage generating apparatus for a headphone is provided, which includes a voltage generator, a charge pump circuit, an operating amplifier and a controller. The voltage generator generates a first operating voltage. The charge pump circuit receives the first operating voltage and an adjusting signal, and generates a second operating voltage according to the first operating voltage and the adjusting signal. The operating amplifier receives the first operating voltage and the second operating voltage serving as the operating voltages thereof and receives an input signal so as to generate an output signal. The controller receives the second operating voltage and a control signal, and generates the adjusting signal according to the second operating voltage and the control signal.

20 Claims, 7 Drawing Sheets

VOLTAGE GENERATING APPARATUS FOR HEADPHONE

CROSS-REFERENCE TO RELATED APPLICATION

This application claims the priority benefit of Taiwan application serial no. 98102324, filed on Jan. 21, 2009. The entirety of the above-mentioned patent application is hereby incorporated by reference herein and made a part of this specification.

BACKGROUND OF THE INVENTION

1. Field of the Invention

The present invention generally relates to a voltage generating apparatus, and more particularly, to a voltage generating apparatus used for a headphone.

2. Description of Related Art

Along with the consumer electronic products get popularized, the function and the quality of being delicate of the peripheral commodities used in the consumer electronic products have enhanced. Taking a headphone suitable for listening music, all of the shape, function and quality thereof have been largely promoted. Driven by green energy consciousness, even a novel kind of power-saved headphone has been lunched already.

Figure 1:
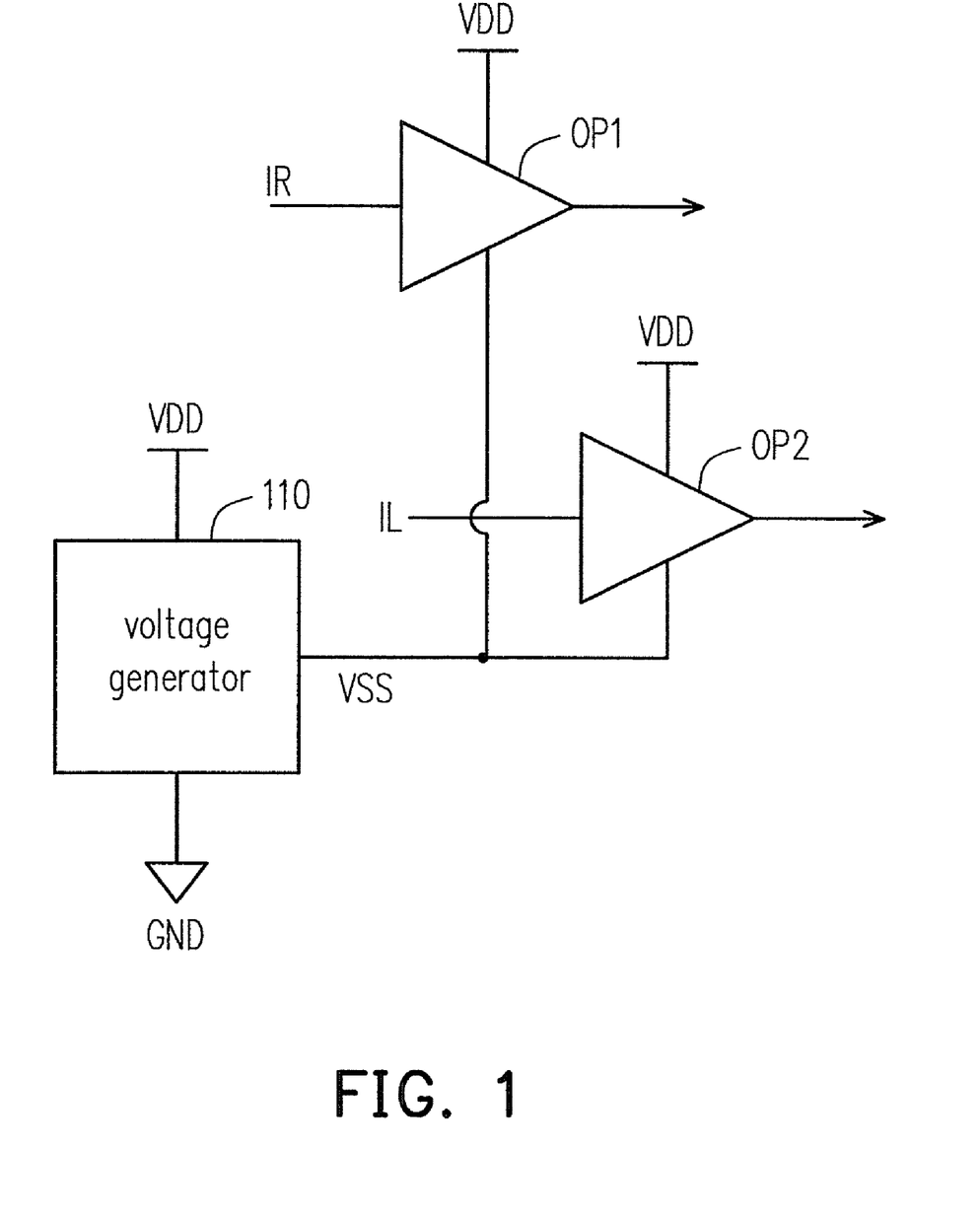
FIG. 1 is a diagram of a conventional voltage generating apparatus 100 for a headphone.

FIG. 1 is a diagram of a conventional voltage generating apparatus 100 for a headphone. The voltage generating apparatus 100 for a headphone needs to output two audio signals with different voltage ranges (for example, a left audio channel signal and a right audio channel signal), so that two operating amplifiers OP1 and OP2 are employed to respectively amplify the corresponding different input signals IL and IR. In the conventional voltage generating apparatus 100, both the operating amplifiers OP1 and OP2 need to receive two operating voltages VDD and VSS as the operating voltages thereof, wherein the operating voltage VSS is generated by a voltage generator 110 according to the operating voltage VDD and a grounding voltage GND (for example, VSS=GND−VDD). Usually, the voltage generator 110 is a charge pump circuit or a power converter composed of inductors and a switch, wherein the conventional voltage generating apparatus 100 always generates a fixed operating voltage VSS regardless of what implementation of the voltage generator 110.

Figure 2:
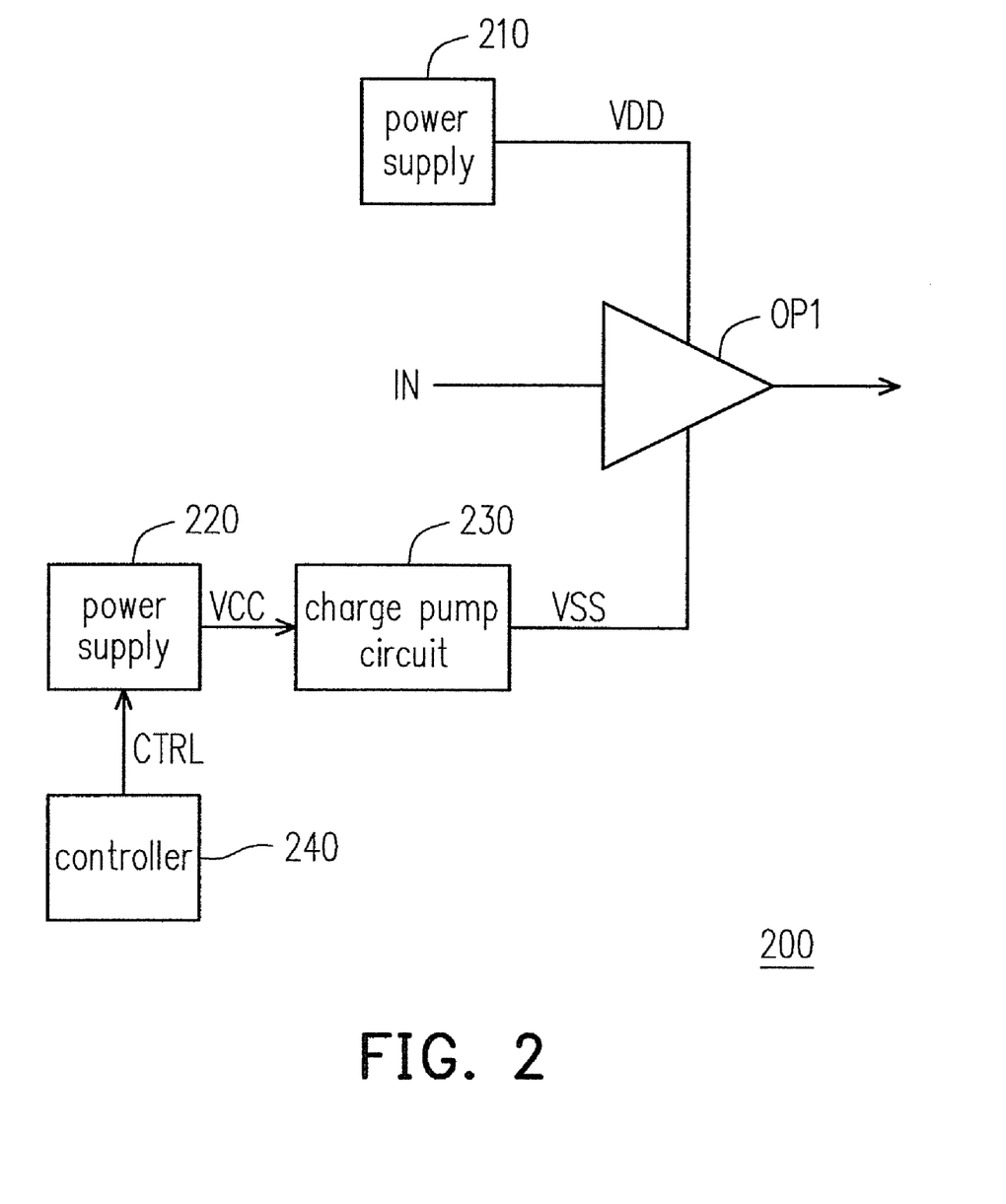
FIG. 2 is a diagram of another conventional voltage generating apparatus 200 for a headphone.

Based on the above-mentioned situation, another conventional voltage generating apparatus 200 for a headphone was provided, as shown by FIG. 2. Referring to FIG. 2, the operating amplifier OP1 in the voltage generating apparatus 200 receives two operating voltages VDD and VSS respectively from a power supply 210 and a charge pump circuit 230, wherein the operating voltage VSS is generated by the charge pump circuit 230 according to an operating voltage VCC generated by another power supply 220. Therefore, a controller 240 in the voltage generating apparatus 200 can send a control signal CTRL to adjust the voltage VCC generated by the power supply 220 to further adjust the operating voltage VSS. However, the control signal CTRL generated by the controller 240 is a fixed value defined by a user or a designer, which can not be dynamically adjusted in response to the changed environment or changed demand.

SUMMARY OF THE INVENTION

Accordingly, the present invention is directed to two kinds of voltage generating apparatuses for a headphone for effectively adjusting and controlling the negative value of the second operating voltage of the headphone.

The present invention provides a voltage generating apparatus for a headphone, which includes a voltage generator, a charge pump circuit, an operating amplifier and a controller. The voltage generator generates a first operating voltage. The charge pump circuit is coupled to the voltage generator for receiving the first operating voltage and an adjusting signal, and generating a second operating voltage according to the first operating voltage and the adjusting signal. The operating amplifier is coupled to the voltage generator and the charge pump circuit for receiving the first operating voltage and the second operating voltage serving as the operating voltages thereof and for receiving an input signal so as to generate an output signal. The controller receives the second operating voltage and a control signal, and generates the adjusting signal according to the second operating voltage and the control signal.

The present invention provides another voltage generating apparatus for a headphone, which includes a first voltage generator, a second voltage generator, a charge pump circuit, an operating amplifier and a controller. The first voltage generator generates a first operating voltage and the second voltage generator generates a base voltage. The charge pump circuit is coupled to the second voltage generator for receiving the base voltage and an adjusting signal, and generating a second operating voltage according to the base voltage and the adjusting signal. The operating amplifier is coupled to the first voltage generator and the charge pump circuit for receiving the first operating voltage and the second operating voltage serving as the operating voltages thereof and for receiving an input signal so as to generate an output signal. The controller receives the second operating voltage and a control signal, and generates the adjusting signal according to the second operating voltage and the control signal.

Based on the described above, the present invention uses a controller to receive the output signal of the voltage generating apparatus and uses the output signal to dynamically adjust the second operating voltage of the voltage generating apparatus, so that the second operating voltage generated by the charge pump circuit is more stable. In addition, the second operating voltage is not limited to a negative integer multiple of the first operating voltage of the voltage generating apparatus; instead, the second operating voltage can be appropriately adjusted according to the demand.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
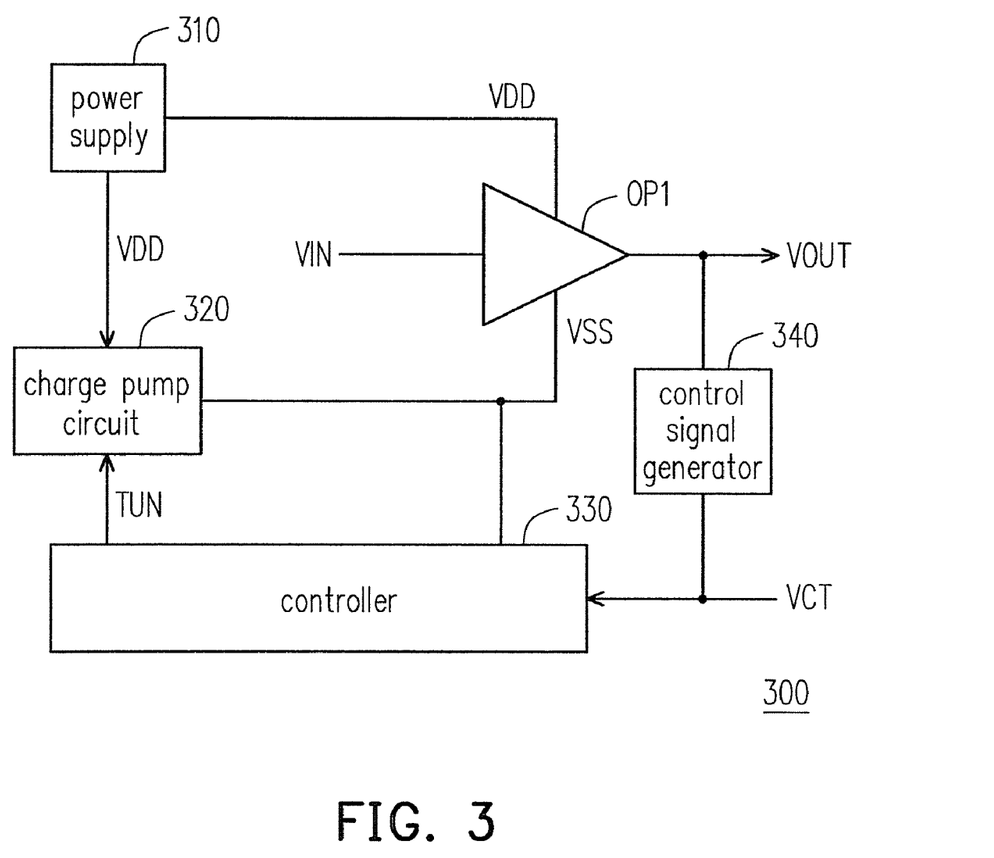
FIG. 3 is diagram of a voltage generating apparatus 300 for a headphone according to an embodiment of the present invention.

FIG. 3 is diagram of a voltage generating apparatus 300 for a headphone according to an embodiment of the present invention. Referring to FIG. 3, the voltage generating apparatus 300 includes a power supply 310, a charge pump circuit 320, an operating amplifier OP1 and a controller 330. The charge pump circuit 320 is coupled to the power supply 310 for receiving an operating voltage VDD generated by the power supply 310. The charge pump circuit 320 is also coupled to the controller 330 to receive an adjusting signal TUN. The operating amplifier OP1 is coupled to the charge pump circuit 320 and the power supply 310 for respectively receiving an operating voltage VSS generated by the charge pump circuit 320 and the operating voltage VDD generated by the power supply 310, wherein the voltages VSS and VDD serve as the operating voltages of the operating amplifier OP1. In addition to coupling the charge pump circuit 320, the controller 330 is also coupled to the operating amplifier OP1, and the controller 330 receives a control signal VCT.

In terms of the overall operations of the voltage generating apparatus 300, the power supply 310 herein generates the operating voltage VDD, wherein the power supply 310 can be implemented by employing, for example, a battery or a DC power produced by rectifying the output of an AC power and using the output from a voltage regulator which connects the battery or the DC power. The power supply 310 can be implemented by a power converter as well. In fact, anyone skilled in the art can implement the power supply 310 able to provide the operating voltage VDD in any scheme.

The charge pump circuit 320 receives the operating voltage VDD and the adjusting signal TUN to generate the operating voltage VSS, wherein the received operating voltage VDD serves as the base of the charge pump, while the adjusting signal TUN is for controlling a plurality of switches (not shown) included by the charge pump circuit 320 for turning the switches on or off. It should be noted that with assistance of unchanged cycles of turning on or off a plurality of switches, a conventional charge pump circuit can provide a voltage with a constant integer multiple of the operating voltage VDD serving as the base. Different from the conventional one, the charge pump circuit 320 in the embodiment can dynamically shift the operating voltage VSS generated by the charge pump circuit 320 between two different integer multiples of the operating voltage VDD according to the adjusting signal TUN, wherein the operating voltage VSS can be equal to, for example, a result of multiplying the operating voltage VDD by negative one or by negative two. In this way, the obtained operating voltage VSS is not limited to an integer multiple of the operating voltage VDD so that the operating voltage VSS can be finely adjusted.

The operating amplifier OP1 receives the operating voltage VDD and the operating voltage VSS, and receives an input signal VIN so as to convert the input signal VIN into an output signal VOUT serving as the audio signal. In addition, the controller 330 receives the operating voltage VSS and the control signal VCT, wherein the controller 330 uses the operating voltage VSS and the control signal VCT to generate the corresponding adjusting signal TUN. In this way, the voltage generating apparatus 300 can instantly detect the operating voltage VSS through the controller 330 and dynamically change the operating voltage VSS through the adjusting signal TUN so as to obtain a desired voltage.

The voltage generating apparatus 300 can further include a control signal generator 340 coupled between the operating amplifier OP1 and the controller 330. The control signal generator 340 receives the output signal VOUT to generate the control signal VCT.

The controller 330 and the control signal generator 340 of the voltage generating apparatus 300 in the embodiment are described in following.

Figure 4A:
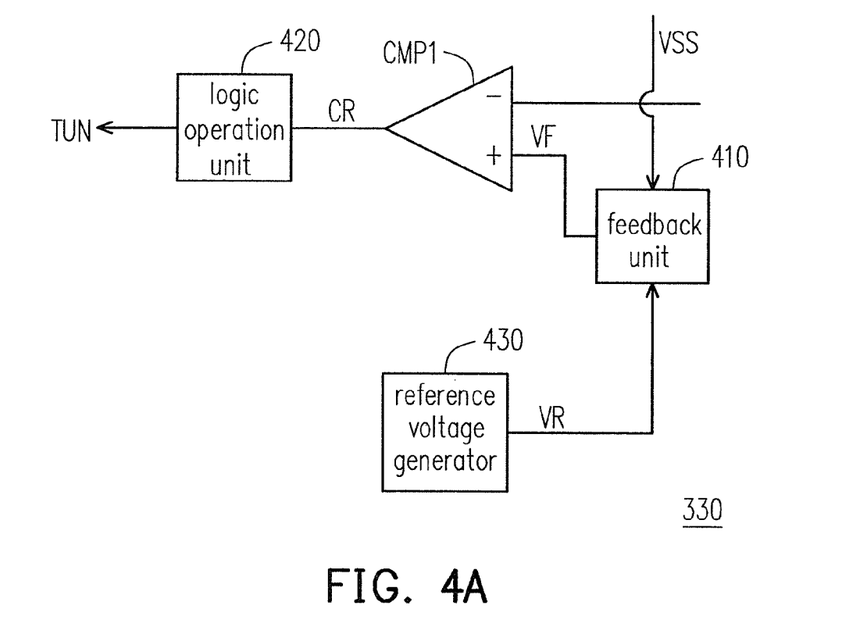
FIG. 4A is a diagram showing an implementation of the controller 330 in the voltage generating apparatus 300 of the above-mentioned embodiment of the present invention.

FIG. 4A is a diagram showing an implementation of the controller 330 in the voltage generating apparatus 300 of the above-mentioned embodiment of the present invention. Referring to FIG. 4A, in the implementation, the controller 330 includes a feedback unit 410, a comparison circuit CMP1, a logic operation unit 420 and a reference voltage generator 430. The feedback unit 410 receives the operating voltage VSS and a reference voltage VR and uses the operating voltage VSS and the reference voltage VR to generate a feedback voltage VF ranged between the operating voltage VSS and the reference voltage VR.

The comparison circuit CMP1 receives the feedback voltage VF and the control signal VCT input from, for example, outside. The comparison circuit CMP1 compares the feedback voltage VF with the voltage value of the control signal VCT so as to generate and output a comparison result CR, wherein the comparison result CR can be a digital logic signal. When the value of the feedback voltage VF is greater than the value of the control signal VCT by the comparison, it indicates the operating voltage VSS needs to be lower by adjusting so that the comparison result CR is a logic-high level to be output. On the other hand, when the value of the feedback voltage VF is not greater than the value of the control signal VCT by the comparison, it indicates the operating voltage VSS needs to be higher by adjusting so that the comparison result CR is a logic-low level to be output. However, when the value of the feedback voltage VF is greater than the value of the control signal VCT by the comparison of the comparison circuit CMP1, the comparison result CR can also be a logic-low level to be output; when the value of the feedback voltage VF is not greater than the value of the control signal VCT by the comparison, the comparison result CR can also be a logic-high level to be output.

The logic operation unit 420 receives the comparison result CR and generates the adjusting signal TUN according to the comparison result CR, wherein since the adjusting signal TUN is output to the charge pump circuit 320 of FIG. 3 and serves as a signal to switch a plurality of switches in the charge pump circuit 320, so that the adjusting signal TUN must be a periodic switching signal. When the comparison result CR generated by the comparison circuit CMP1 indicates the operating voltage VSS needs to be higher by adjusting, the logic operation unit 420 would correspondingly generate an adjusting signal TUN enabling the charge pump circuit 320 to generate a higher operating voltage VSS; contrarily, the comparison result CR generated by the comparison circuit CMP1 indicates the operating voltage VSS needs to be lower by adjusting, the logic operation unit 420 would correspondingly generate an adjusting signal TUN enabling the charge pump circuit 320 to generate a lower operating voltage VSS.

The reference voltage VR can be generated by the reference voltage generator 430 and the reference voltage generator 430 can be implemented by a simple voltage-dividing circuit composed of a resistors-string, or by using a somehow complicated power converter or a band gap voltage generator. Anyone skilled in the art can easily take any appropriate apparatus and the corresponding method to implement the reference voltage generator 430 so as to provide an unchanged voltage or an adjustable voltage.

Figure 4B:
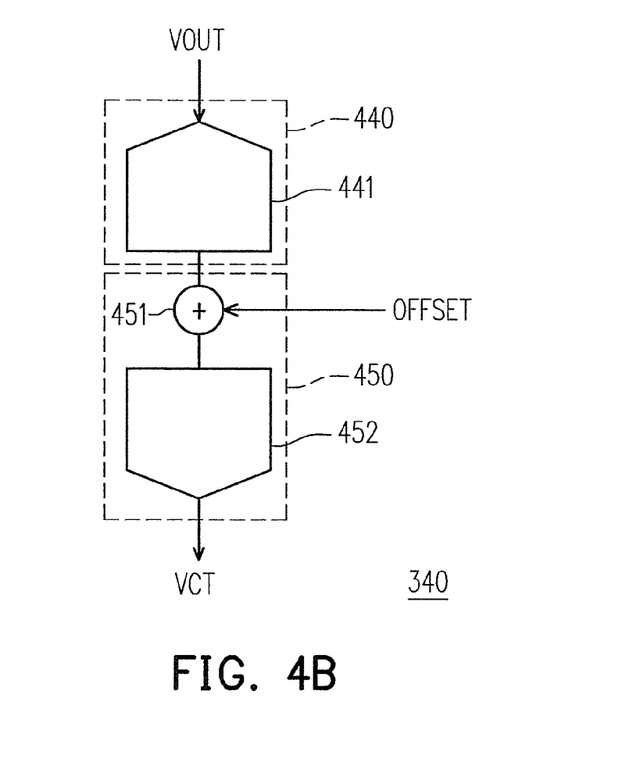
FIG. 4B is a diagram showing an implementation of the control signal generator 340 in the voltage generating apparatus 300 of the above-mentioned embodiment of the present invention.

FIG. 4B is a diagram showing an implementation of the control signal generator 340 in the voltage generating apparatus 300 of the above-mentioned embodiment of the present invention. Referring to FIG. 4B, the control signal generator 340 includes a peak-value signal detector 440 and a level-adjusting circuit 450, wherein the peak-value signal detector 440 receives an output signal VOUT and generates a peak-value signal through detecting the peak-values in the output signal VOUT; the level-adjusting circuit 450 is coupled to the peak-value signal detector 440 for adjusting the level of the peak-value signal so as to generate the control signal VCT.

In the embodiment, the peak-value signal detector 440 is implemented by using an analog-to-digital converting unit (ADC unit) 441. The ADC unit 441 receives the output signal VOUT and converts the received output signal VOUT into a digital one. It is a common knowledge for anyone skilled in the art that it is very easy to detect out a peak-value signal in a digital signal and to implement the peak-value signal detector 440 by using the ADC unit 441. The level-adjusting circuit 450 includes a level-offsetting unit 451 and a digital-to-analog converting unit (DAC unit) 452, wherein the level-offsetting unit 451 receives the peak-value signal generated by the peak-value signal detector 440 and shifts the peak-value signal by an offset so as to generate an offset peak-value signal. The DAC unit 452 herein converts the offset peak-value signal into an analog one to further generate the control signal VCT.

In the following, the other different embodiments for a voltage generating apparatus are depicted.

Figure 5:
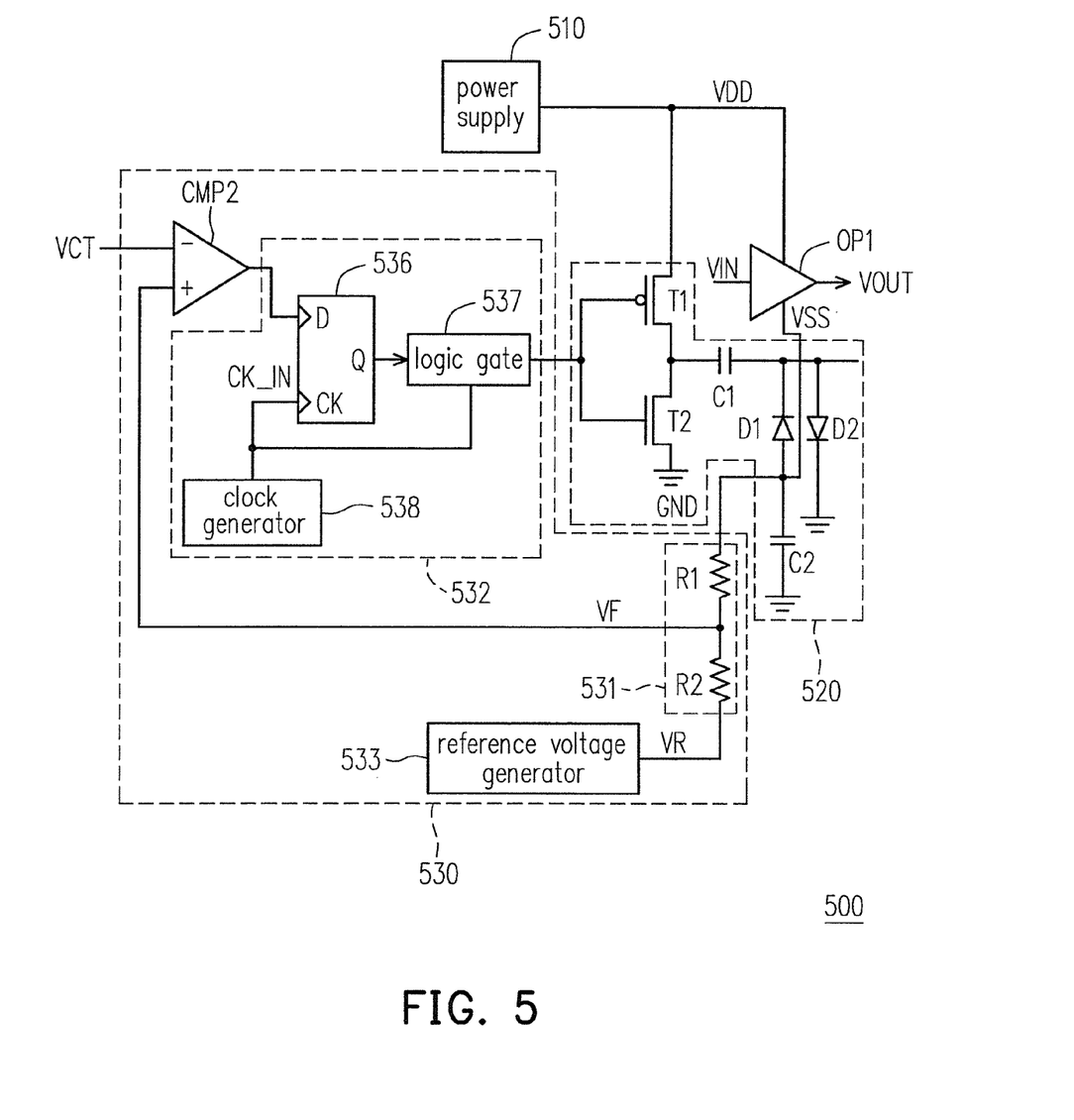
FIG. 5 is a diagram of a voltage generating apparatus 500 according to another embodiment of the present invention.

FIG. 5 is a diagram of a voltage generating apparatus 500 according to another embodiment of the present invention. Referring to FIG. 5, the voltage generating apparatus 500 includes a power supply 510, a charge pump circuit 520, an operating amplifier OP1 and a controller 530. The charge pump circuit 520 includes two transistors T1 and T2 serving as switches, two capacitors C1 and C2 and two diodes D1 and D2. The charge pump circuit 520 receives the operating voltage VDD and generates the operating voltage VSS equal to the result of multiplying the operating voltage VDD by negative one. When the transistor T1 is turned on and the transistor T2 is turned off, the connection node between the capacitor C1 and the transistor T1 is charged to a level equal to the operating voltage VDD; when the transistor T1 is turned off and the transistor T2 is turned on, the connection node between the capacitor C1 and the transistor T1 is connected to a grounding voltage GND through the transistor T2 and the level of a terminal of the capacitor C1 connecting the diode D1 is changed to −VDD, and meanwhile the diode D1 is turned on to charge the capacitor C2 to −VDD (i.e., the operating voltage VSS=−VDD).

In the voltage generating apparatus 500, the controller 530 includes a feedback unit 531, a comparison circuit CMP2, a logic operation unit 532 and a reference voltage generator 533. The feedback unit 531 is implemented by a voltage-dividing component composed of a resistors-string of R1 and R2. The comparison circuit CMP2 compares the control signal VCT with the feedback voltage VF generated by the feedback unit 531 so that the operating voltage VSS is generated through the charge pump circuit 520 and the controller 530. When the above-mentioned feedback reaches a stable state, the feedback voltage VF would be equal to the control signal, and meanwhile there exists the following relationship between the operating voltage VSS, the feedback voltage VF and the resistances of the resistors-string of R1 and R2:

$$VSS = \frac{R1 + R2}{R2} \times VCT - \frac{R1}{R2} \times VR \quad (1)$$

wherein the reference voltage VR is generated by the reference voltage generator 533.

The logic operation unit 532 includes a flip-flop 536, a logic gate 537 and a clock generator 538. The flip-flop 536 has a data terminal D, a clock terminal CK and an output terminal Q. The clock terminal CK receives a clock signal CK_IN; the logic gate 537 is coupled to the output terminal Q of the flip-flop 536, receives the clock signal CK_IN, adjusts the clock signal CK_IN according to the signal of the output terminal Q of the flip-flop 536 and outputs the adjusted clock signal CK_IN to the charge pump circuit 520. The flip-flop 536 herein sends the comparison result generated by the comparison circuit CMP2 to the logic gate 537. The logic gate 537 would send the clock signal CK_IN generated by the clock generator to the transistors T1 and T2 serving as two switches to control the corresponding switching according to the comparison result delivered by the flip-flop 536.

Figure 6:
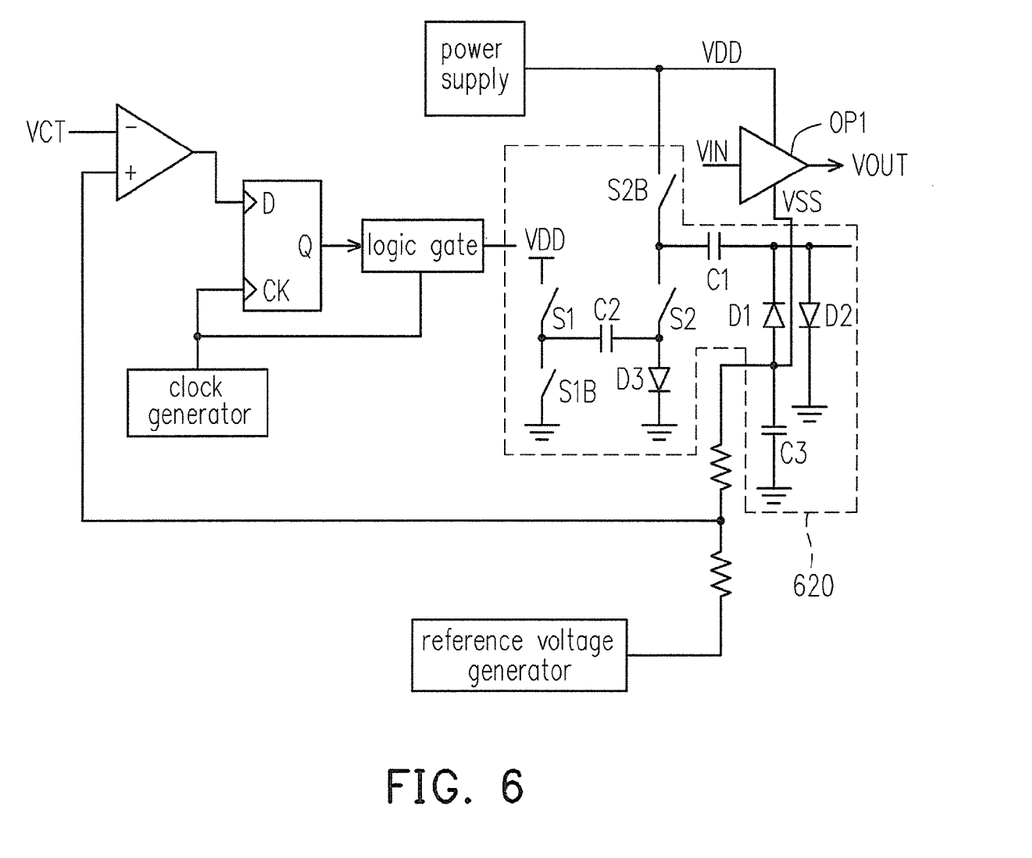
FIG. 6 is a diagram of a voltage generating apparatus 600 according to yet another embodiment of the present invention.

FIG. 6 is a diagram of a voltage generating apparatus 600 according to yet another embodiment of the present invention. Different from the voltage generating apparatus 500 of the above-mentioned embodiment, the voltage generating apparatus 600 herein includes a charge pump circuit 620 which can generate an operating voltage VSS ranged between 0 and the result of multiplying the operating voltage VDD by negative two. The charge pump circuit 620 comprises three capacitors C1-C3, four switches S1, S1B, S2 and S2B and three diodes D1-D3. It can be seen herein, different charge pump circuits can be used to realize the voltage generating apparatus of the present invention, wherein the structure of the charge pump circuit is not unchanged.

Figure 7:
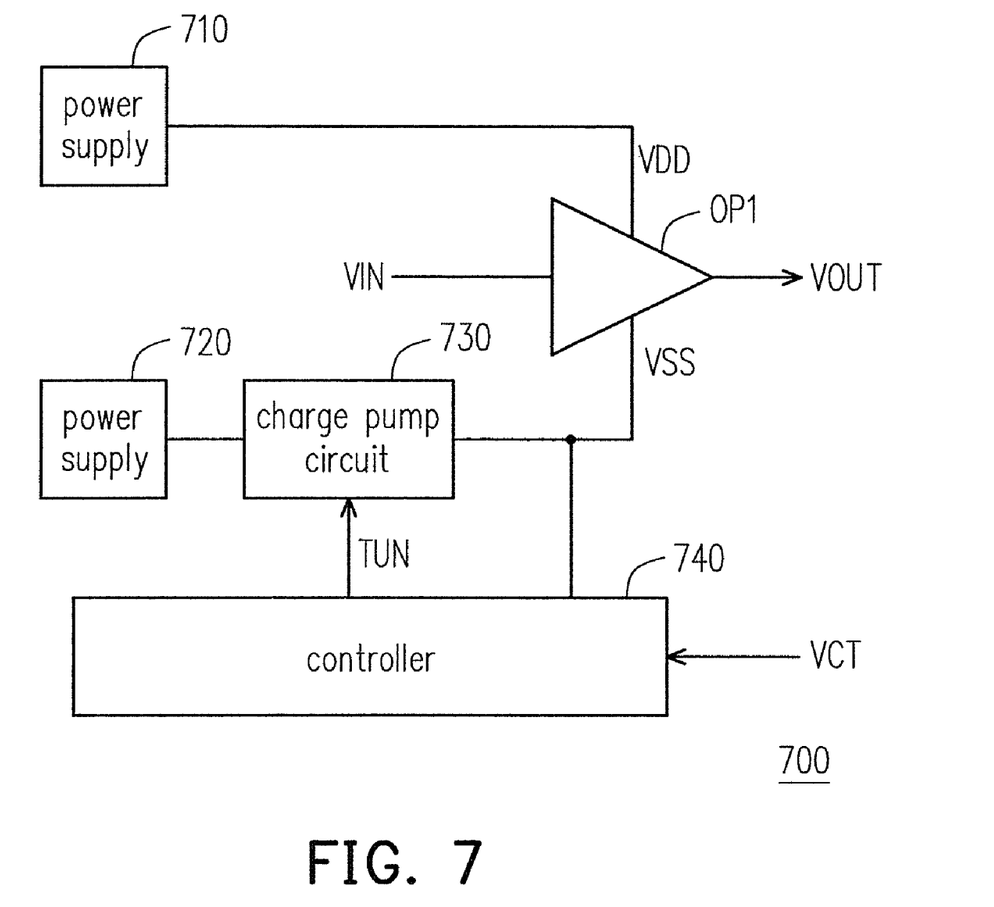
FIG. 7 is a diagram of a voltage generating apparatus 700 according to yet another embodiment of the present invention.

FIG. 7 is a diagram of a voltage generating apparatus 700 according to yet another embodiment of the present invention. In the embodiment, different from the voltage generating apparatus 500 or 600, the operating voltage VDD is generated by a power supply 710 and a charge pump circuit 730 generating the operating voltage VSS receives a base voltage VCC generated by another power supply 720. The operation detail of a controller 740 herein is same as that of the controller in the voltage generating apparatus 500 or 600, and it is omitted to describe.

In summary, the present invention uses a controller to detect an operating voltage and further adjust the operating voltage, which enables the voltage generating apparatus for a headphone to dynamically adjust the voltage range thereof. In this way, when the desired voltage of the output signal does not vary in a larger range, the level of the operating voltage is correspondingly lower by adjusting; when the desired voltage of the output signal varies in a larger range, the level of the operating voltage is correspondingly higher by adjusting. By means of the above-mentioned scheme, the present invention can effectively save electric power.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A voltage generating apparatus for a headphone, comprising:
   a power supply, generating a first operating voltage;
   a charge pump circuit, coupled to the power supply, receiving the first operating voltage and an adjusting signal and generating a second operating voltage according to the first operating voltage and the adjusting signal;
   an operating amplifier, coupled to the power supply and the charge pump circuit, receiving the first operating voltage and the second operating voltage serving as the operating voltages thereof, receiving an input signal and generating an output signal; and
   a controller, receiving the second operating voltage and a control signal and generating the adjusting signal according to the second operating voltage and the control signal.

2. The voltage generating apparatus as claimed in claim 1, wherein the controller comprises:
   a feedback unit, receiving the second operating voltage and a reference voltage and generating a feedback voltage ranged between the second operating voltage and the reference voltage;
   a comparison circuit, coupled to the feedback unit, receiving the control signal and comparing the control signal with the feedback voltage to generate a comparison result; and
   a logic operation unit, coupled to the comparison circuit and generating the adjusting signal according to the comparison result.

3. The voltage generating apparatus as claimed in claim 2, wherein the controller further comprises:
   a reference voltage generator, coupled to the feedback unit for generating the reference voltage.

4. The voltage generating apparatus as claimed in claim 1, wherein the feedback unit comprises:
   a voltage-dividing component, having two terminals, wherein a terminal receives the second operating voltage, another terminal receives the reference voltage and the voltage-dividing component generates the feedback voltage by dividing the second operating voltage and the reference voltage and according to the result after the dividing.

5. The voltage generating apparatus as claimed in claim 4, wherein the voltage-dividing component comprises:
   a first resistors-string, having an end for receiving the second operating voltage; and
   a second resistors-string, having two ends, wherein an end is coupled to the first resistors-string and generates the feedback voltage, and another end receives the reference voltage.

6. The voltage generating apparatus as claimed in claim 2, wherein the logic operation unit comprises:
   a flip-flop, having a data terminal, a clock terminal and an output terminal, wherein the clock terminal receives a clock signal and the data terminal receives the comparison result; and
   a logic gate, coupled to the output terminal of the flip-flop, receiving the clock signal, adjusting the clock signal according to the signal at the output terminal of the flip-flop and sending the adjusted clock signal to the charge pump circuit.

7. The voltage generating apparatus as claimed in claim 1, further comprising:
   a control signal generator, coupled to the controller and the operating amplifier for generating the control signal according to the output signal.

8. The voltage generating apparatus as claimed in claim 7, wherein the control signal generator comprises:
   a peak-value signal detector, coupled to the operating amplifier, receiving the output signal and generating a peak-value signal by detecting the peak-value of the output signal; and
   a level-adjusting circuit, coupled to the peak-value signal detector and the controller for adjusting the level of the peak-value signal so as to generate the control signal.

9. The voltage generating apparatus as claimed in claim 8, wherein the peak-value signal detector comprises:
   an analog-to-digital converting unit, coupled to the operating amplifier, receiving the output signal and converting the output signal into a digital output signal;
   wherein the peak-value signal detector detects the peak-value of the output signal by means of the digital output signal so as to generate the peak-value signal.

10. The voltage generating apparatus as claimed in claim 9, wherein the level-adjusting circuit comprises:
    a level-offsetting unit, coupled to the analog-to-digital converting unit, receiving the peak-value signal and offsetting the peak-value signal by an offset value to generate an offset peak-value signal; and
    a digital-to-analog converting unit, coupled to the level-offsetting unit, receiving the offset peak-value signal, converting the offset peak-value signal into an analog offset peak-value signal and generating the control signal.

11. A voltage generating apparatus for a headphone, comprising:
    a first operation power supply, generating a first operating voltage;
    a second operation power supply, generating a base voltage;
    a charge pump circuit, coupled to the second operation power supply, receiving the base voltage and an adjusting signal and generating a second operating voltage according to the base voltage and the adjusting signal;
    an operating amplifier, coupled to the first operation power supply and the charge pump circuit, receiving the first operating voltage and the second operating voltage serving as the operating voltages thereof, receiving an input signal and generating an output signal; and
    a controller, receiving the second operating voltage and a control signal and generating the adjusting signal according to the second operating voltage and the control signal.

12. The voltage generating apparatus as claimed in claim 11, wherein the controller comprises:
    a feedback unit, receiving the second operating voltage and a reference voltage and generating a feedback voltage ranged between the second operating voltage and the reference voltage;
    a comparison circuit, coupled to the feedback unit, receiving the control signal and comparing the control signal with the feedback voltage to generate a comparison result; and a logic operation unit, coupled to the comparison circuit and generating the adjusting signal according to the comparison result.

13. The voltage generating apparatus as claimed in claim 12, wherein the controller further comprises:
a reference voltage generator, coupled to the feedback unit for generating the reference voltage.

14. The voltage generating apparatus as claimed in claim 11, wherein the feedback unit comprises:
a voltage-dividing component, having two terminals, wherein a terminal receives the second operating voltage, another terminal receives the reference voltage and the voltage-dividing component generates the feedback voltage by dividing the second operating voltage and the reference voltage and according to the result after the dividing.

15. The voltage generating apparatus as claimed in claim 14, wherein the voltage-dividing component comprises:
a first resistors-string, having an end for receiving the second operating voltage; and
a second resistors-string, having two ends, wherein an end is coupled to the first resistors-string and generates the feedback voltage, and another end receives the reference voltage.

16. The voltage generating apparatus as claimed in claim 12, wherein the logic operation unit comprises:
a flip-flop, having a data terminal, a clock terminal and an output terminal, wherein the clock terminal receives a clock signal and the data terminal receives the comparison result; and
a logic gate, coupled to the output terminal of the flip-flop, receiving the clock signal, adjusting the clock signal according to the signal at the output terminal of the flip-flop and sending the adjusted clock signal to the charge pump circuit.

17. The voltage generating apparatus as claimed in claim 11, further comprising:
a control signal generator, coupled to the controller and the operating amplifier for generating the control signal according to the output signal.

18. The voltage generating apparatus as claimed in claim 17, wherein the control signal generator comprises:
a peak-value signal detector, coupled to the operating amplifier, receiving the output signal and generating a peak-value signal by detecting the peak-value of the output signal; and
a level-adjusting circuit, coupled to the peak-value signal detector and the controller for adjusting the level of the peak-value signal so as to generate the control signal.

19. The voltage generating apparatus as claimed in claim 18, wherein the peak-value signal detector comprises:
an analog-to-digital converting unit, coupled to the operating amplifier, receiving the output signal and converting the output signal into a digital output signal;
wherein the peak-value signal detector detects the peak-value of the output signal by means of the digital output signal so as to generate the peak-value signal.

20. The voltage generating apparatus as claimed in claim 19, wherein the level-adjusting circuit comprises:
a level-offsetting unit, coupled to the analog-to-digital converting unit, receiving the peak-value signal and offsetting the peak-value signal by an offset value to generate an offset peak-value signal; and
a digital-to-analog converting unit, coupled to the level-offsetting unit, receiving the offset peak-value signal, converting the offset peak-value signal into an analog offset peak-value signal and generating the control signal.

* * * * *